Aug. 22, 1933.     R. J. POMEROY     1,923,746
MODIFICATION OF SOUND RECORDS
Filed Sept. 15, 1931

Inventor
Roy J. Pomeroy.

Attorney.

Patented Aug. 22, 1933

1,923,746

UNITED STATES PATENT OFFICE 1,923,746

MODIFICATION OF SOUND RECORDS

Roy J. Pomeroy, Los Angeles, Calif.

Application September 15, 1931
Serial No. 562,894

11 Claims. (Cl. 179—100.3)

This invention has to do generally with modification of photographic sound records subsequent to initial recordation, and especially to modification of volume characteristics of sound records.

It often occurs in recording sound that certain sound effects, or certain parts of a sound sequence, are recorded at an undesirable volume level, and in such cases, to avoid re-recording the entire sequence, it is proposed suitably to modify those particular parts of the record. Again, it is often desirable to effect a continuously controlled volume modification or correction of an entire recorded musical composition, either to match the temper of an accompanying picture, or to compensate unbalance, for instance, between instruments located at different distances from the recording microphone, or to compensate undesirable volume changes introduced while make the original recording. The above may be taken as typical of the invention, although many other situations arise wherein it becomes desirable to modify a record after initial recordation.

It is therefore an object of the present invention to provide a simple method and means whereby an original sound record may be modified.

Reference is here directed to my parent application entitled "System for modifying sound records", Ser. No. 260,698, filed March 10, 1928, allowed June 9, 1930, renewed June 6, 1931, and allowed August 6, 1931, of which the present application is a continuation in part, the present application including claims divided from said parent application.

The method specifically claimed in said original case involved reproducing sound from an original record, effecting a control of the reproduced sound by means of a manually operated electrical sound current controller in the output circuit of the system, and making a new or modified sound record from the sound current as so controlled. The method specifically claimed in the present case, also described in said original case, involves making a modification record band of the modifications desired, and combining said band with an original or print of an original record.

The invention will now be more fully understood from the following detailed description of a typical system for carrying the invention into effect, reference for this purpose being had to the accompanying drawing, in which.

It is to be understood that while certain types of sound records are hereinafter specifically mentioned in illustrating the invention, other types of records may be substituted, and any such substitutions are contemplated within the scope of my broader claims.

Figure 1:
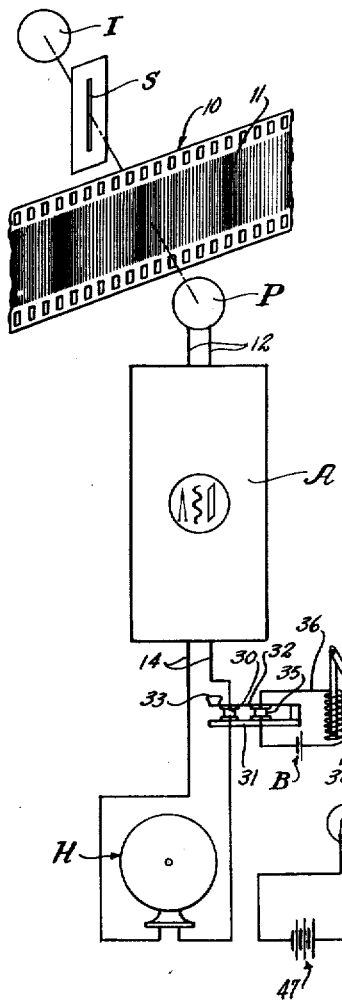
Fig. 1 is a schematic layout of a system typifying the invention.

In Fig. 1 of the drawing numeral 10 denotes a traveling photographic film having a sound record 11 thereon, said record here being shown as of the variable density, constant width type. Let it be assumed that record 11 is the original photographic record of the recording, and that the volume characteristics of said record are to be modified. Opposite one side of the film is an illuminant I, a light slit S being shown between said illuminant and the film, and on the other side of the film, positioned to be light affected by rays from I transmitted through the record on the film, is a photoelectric cell P. The light rays impinging on cell P are modulated by the sound record on the film, and causes an electrical sound current corresponding to said record to flow in the circuit 12 of said cell. Circuit 12 is connected to the input terminals of an amplifier A, conventionally illustrated as of the vacuum tube type, and the output circuit 14 of said amplifier leads to a speaker H.

A manually controllable variable resistance 30 is included in circuit 14. This variable resistance may be of any convenient type, a suitable form, indicated in the figure, being a carbon button resistance 30 mounted between a base 31 and a spring arm 32 supported upon said base. Arm 32 may be provided with a knob or key 33, and the electrical resistance of the carbon button is varied by pressure upon said knob. The terminals of the carbon button are electrically connected into circuit 14, for instance, as indicated in Fig. 1.

When film 10 with original record 11 is run before the photoelectric cell, a sound current corresponding thereto is produced by cell P and fed to amplifier A, and the amplified sound current output is conducted by circuit 14 to speaker H and there audibly reproduced. Control of resistance 30 by manual pressure on knob or key 33 then controls the volume of the sound reproduced at H, as will be clearly understood.

Between volume controller base 31 and spring arm 32 is a second variable resistance, or carbon bottom 35, which is operated together with and proportionately to resistance 30. Resistance 35 is included in a circuit 36, said circuit 36 having also a battery B and a shutter actuating means conventionally illustrated at 38. A shutter 40, actuated by said means 38 in accordance with the current flowing in circuit 36, moves back and forth longitudinally over a slit 42, behind and transversely to which travels a raw film 45. The front face of a slit 42 is constantly illuminated as by an illuminant 46, fed by a battery 47. It will now be understood that the position of shutter 40, and hence the length of the line of light incident across the film, is dependent upon the current flowing in shutter actuating means 38, and hence upon the value of variable resistance 35 as controlled by key 33. And, as will now be evident, since the pressure on said key 33 corresponds to the modifications manually imposed on the sound reproduced from speaker H, the film 45 will take a varying width record 50 of the imposed modifications.

Figure 2:
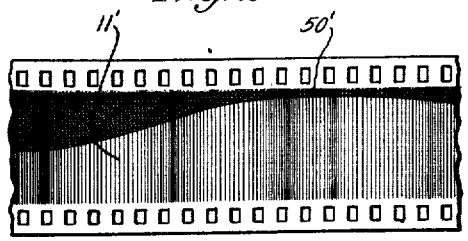
Fig. 2 shows an original record modified by a modification band.

Thus the original record 11 is reproduced by speaker H, while an operator, listening to the reproduction, controls the sound current leading to speaker H by means of key 33, and by means of the recording system simultaneously controlled by key 33 there is produced a varying width record 50 of the sound current modifications so imposed. A copy 50' of record 50, in the present case, is then printed on a film with, or over, a copy 11' of the original record 11 (see Fig. 2), care being taken to see that the modification band is in proper register with the sound record.

Figure 3:
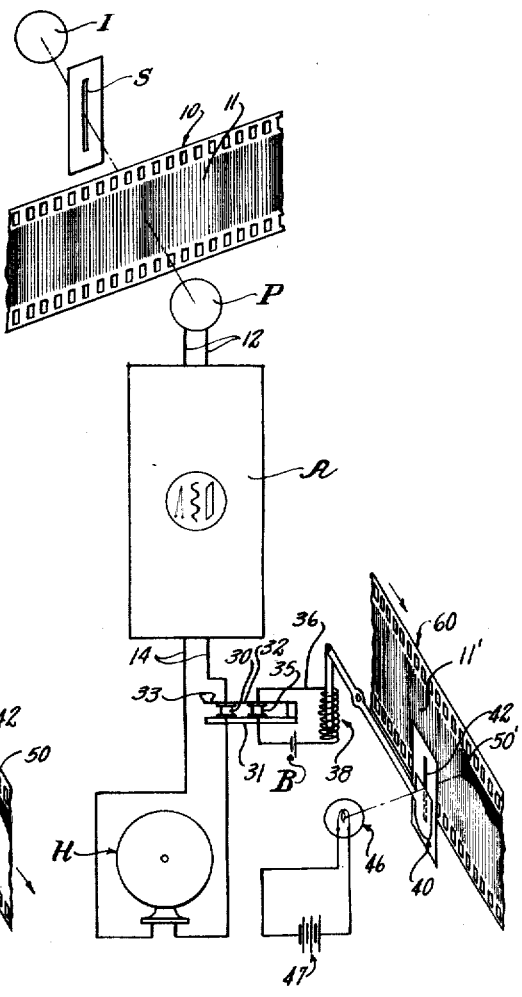
Fig. 3 shows a variational scheme for making the modified record.

In Fig. 3 I have illustrated how the variable width modification band 50' may be printed at once with a print 11' of the original record, it being understood that the system is the same as that shown in Fig. 1, but that the film 60 run before the recording means has a print of the original record. In this case the subsequent step of combining the original record with the modification band is eliminated.

As is well known, the volume characteristic of a variable density, constant width photographic sound record is directly proportional to the width of the record band. Hence, by combining the print 50' of the varying width record of the volume modifications with a print 11' of the original record 11, as by superposing the two in proper register with one another (see Fig. 2), the volume characteristics of the sound record are modified in direct proportion to the variable width of the modification band 50'. The variable width band 50' preferably is made sufficiently opaque that the portion of the variable density record covered thereby is completely masked. And of course the width of the mask may vary from zero to one hundred percent of the sound track width.

It is to be understood that various modifications may be made in the system without departing from the spirit and scope of the claims appended hereto, the system above described being merely one simple illustrative form of the invention rather than imposing any limitation upon how or to what purpose the invention may be carried into effect in practice. The invention is therefore not to be limited except as may be construed from a fair interpretation of the following claims.

I claim:

1. The method of producing volume-modified sound records, that includes: audibly reproducing sound from a record to be modified, artificially modifying the volume characteristics of the sound by reference to the sound as it is reproduced, simultaneously making a record of the artificial modifications imposed, and modifying the original record by means of said record of volume modifications.

2. The method of producing volume-modified sound records, that includes: audibly reproducing sound from a record to be modified, artificially modifying the volume characteristics of the sound by reference to the sound as it is reproduced, simultaneously making a record of the artificial modifications imposed, and making a volume modified record by combination in proper register of said record of volume modifications with said original record.

3. The method of modifying sound records, that includes audibly reproducing sound from an original sound record, manually controlling the characteristics of the sound by reference to the sound as reproduced, simultaneously making a record of the modifications imposed by such control, and making a modified record by combination in proper register of said record of modifications with an original record.

4. The method of producing a modified photographic sound record from an original photographic sound record, that includes producing a photographic opaque modification band of varying width by reference to the amplitude characteristics of the original record, and combining on a film in proper register with each other said varying width modification band and a print of said original record.

5. The method of producing a modified photographic sound record from an original photographic sound record, that includes producing a photographic opaque modification band of varying width by reference to the amplitude characteristics of the original record, and combining on a film in proper register with each other a print of said varying width modification band and a print of said original record.

6. In a system for making volume modified sound records, means for producing an electrical sound current from an original sound record, sound reproducing means fed by said sound current, means for manually controlling the amplitude of said sound current, and means for simultaneously recording amplitude modifications of said sound current imposed by said manual controlling means.

7. In a system for making volume modified sound records, means for producing an electrical sound current from an original sound record, sound reproducing means fed by said sound current, means for producing and recording an independent electrical current, and unitary means for simultaneously controlling the strength of said last mentioned current and the amplitude of the sound current being reproduced.

8. In a system for making volume modified sound records, means for producing an electrical sound current from an original sound record, sound reproducing means fed by said sound current, means for producing and recording an independent electrical current, and means for controlling the amplitude of said last mentioned current in accordance with amplitude characteristics of the sound current.

9. In a system for making modified photographic sound records, means for producing an electrical sound current from an original photographic sound record, photographic recording means for producing an opaque varying width band in accordance with an undulating current fed thereto and means adapted to be actuated in accordance with amplitude characteristics of said sound current for producing an undulating electrical current to be fed to said recording means.

10. The method of producing photographic sound records, that includes producing a normal original photographic sound record, producing a photographic varying width band of opacity whose width is correlated in required manner with amplification characteristics found in the original record, and combining on a film in proper register with each other said varying width band and an original record.

11. In a system of the character described, the combination of means for producing and amplifying a normal electrical sound current, means for producing a controllable electrical current, means for recording the last mentioned current as a varying width photographic band, and means for controlling the amplitude of said controllable current in accordance with amplitude characteristics of said amplified sound current, all in such manner as to produce a varying width photographic band of width correlated to amplitude characteristics of the sound current.

ROY J. POMEROY.

DISCLAIMER 1,923,746.—*Roy J. Pomeroy*, Los Angeles, Calif. MODIFICATION OF SOUND RECORDS. Patent dated August 22, 1933. Disclaimer filed December 12, 1944, by the assignee, *Radio Corporation of America*.

Hereby enters this disclaimer to claims 4, 5, and 10 of said patent.

[Official Gazette January 9, 1945.]

fed thereto and means adapted to be actuated in accordance with amplitude characteristics of said sound current for producing an undulating electrical current to be fed to said recording means.

10. The method of producing photographic sound records, that includes producing a normal original photographic sound record, producing a photographic varying width band of opacity whose width is correlated in required manner with amplification characteristics found in the original record, and combining on a film in proper register with each other said varying width band and an original record.

11. In a system of the character described, the combination of means for producing and amplifying a normal electrical sound current, means for producing a controllable electrical current, means for recording the last mentioned current as a varying width photographic band, and means for controlling the amplitude of said controllable current in accordance with amplitude characteristics of said amplified sound current, all in such manner as to produce a varying width photographic band of width correlated to amplitude characteristics of the sound current.

ROY J. POMEROY.

DISCLAIMER 1,923,746.—*Roy J. Pomeroy*, Los Angeles, Calif. MODIFICATION OF SOUND RECORDS. Patent dated August 22, 1933. Disclaimer filed December 12, 1944, by the assignee, *Radio Corporation of America*.

Hereby enters this disclaimer to claims 4, 5, and 10 of said patent.

[Official Gazette January 9, 1945.]

DISCLAIMER 1,923,746.—*Roy J. Pomeroy,* Los Angeles, Calif. MODIFICATION OF SOUND RECORDS.
Patent dated August 22, 1933. Disclaimer filed December 12, 1944, by the
assignee, *Radio Corporation of America.*

Hereby enters this disclaimer to claims 4, 5, and 10 of said patent.

[Official Gazette January 9, 1945.]